Figure 1:
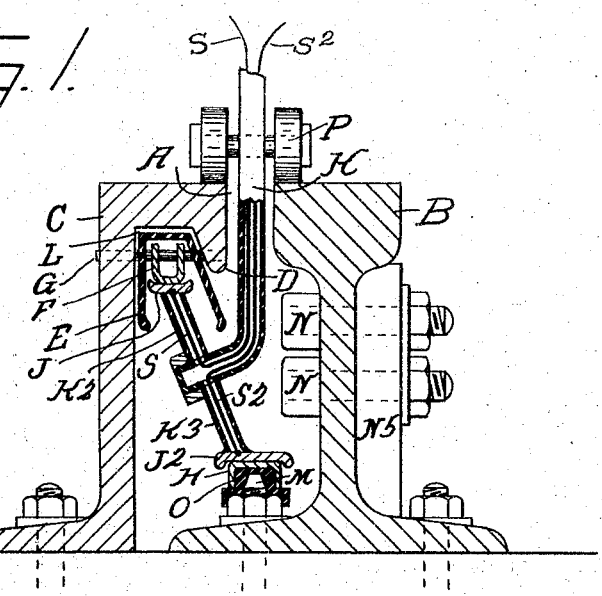

No. 781,268. PATENTED JAN. 31, 1905.
W. COPE.
UNDERGROUND OR CONDUIT SYSTEM FOR ELECTRIC RAILWAYS.
APPLICATION FILED MAY 24, 1904.

WITNESSES

INVENTOR
William Cope
BY Edgar Tate & Co. ATTORNEYS.

No. 781,268.

Patented January 31, 1905.

UNITED STATES PATENT OFFICE.

WILLIAM COPE, OF BIRMINGHAM, ENGLAND.

UNDERGROUND OR CONDUIT SYSTEM FOR ELECTRIC RAILWAYS.

SPECIFICATION forming part of Letters Patent No. 781,268, dated January 31, 1905.

Application filed May 24, 1904. Serial No. 209,537.

*To all whom it may concern:*

Be it known that I, WILLIAM COPE, a subject of the King of Great Britain, residing at Birmingham, England, have invented certain new and useful Improvements in Underground or Conduit Systems for Electric Railways, of which the following is a specification, such as will enable those skilled in the art to which it appertains to make and use the same.
This invention relates to underground or conduit systems for electric railways; and the object thereof is to provide means to secure the public from danger caused by the operation of railways of this class and also to provide a simple and effective system or apparatus whereby the operation of railways of this class will be simplified and rendered more effectual and inexpensive; and with this and other objects in view the invention consists in the construction, combination, and arrangement of parts hereinafter described and claimed.

The invention is fully disclosed in the following specification, of which the accompanying drawings form a part, in which the separate parts of my improvement are designated by suitable reference characters in each of the views, and in which—

Figure 2:
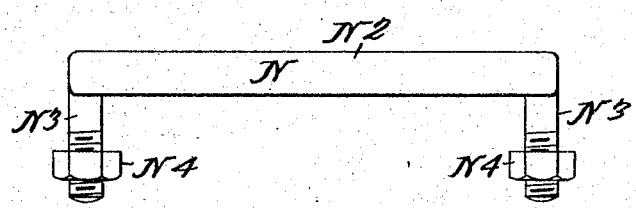
Figure 3:
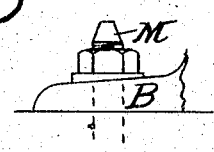

Figure 1 is a transverse section of an underground conduit which I employ and showing the operative parts of the apparatus or system, part of which is in section; Fig. 2, a plan view of a part of clamping devices which I employ as a rail-coupler, and Fig. 3 a side view and a part of the means for holding the conductor or conduit in position.

The chief object of this invention is to place underground and near the surface and within the depth required for an ordinary tram-rail the lead or conductor now used in the overhead system of electric traction, and thereby to secure the public from the danger caused by broken wires and also to do away with the disfigurement of the public thoroughfares. This is done in such a manner that the lead, which is a strip of metal bent into shape like a horseshoe, shall be near the surface of the road, insulated and protected from wet, accessible for examination and repair, but inaccessible to any person not engaged in the tram service. By the introduction of a new trolley leg and foot the trolley-arm is dispensed with, or if the trolley-arm be retained for tracks now in use the same car can be used on new tracks laid with my underground conduit system. The second lead used for the return current does away with the bonding of the rails.

In the drawings forming part of this specification I have shown an ordinary T-rail B, which is preferably sunk beneath the surface of the ground, and arranged parallel with the T-rail B is a guide-rail C, between which and said T-rail is a slot A, in which the trolley-leg K is adapted to pass. The guard-rail C is provided on the upper portion thereof with a downwardly-projecting flange D, forming a recess L in said guard-rail, and in the practice of my invention I prefer to use an insulator-channel E, so formed as to fit into the recess L and within which and supported by insulating-pegs G is a lead F, curved into horseshoe shape and kept clear of the insulator-channel E by means of the pegs G or any other suitable device.

Mounted upon the bolts M, which serve to hold the T-rail B in position on the sleepers, is a conductor-strip H, which serves as the return-lead and between which and said bolts M is an insulating-strip O; but this insulating-strip may be dispensed with and the inner side of the return-lead H may be coated with insulating material and so shaped as to engage with and fit upon the tops of the bolts M, which are preferably made wedge-shaped, the return-lead H being held on said bolts M by gravity or being secured thereon in any desired manner.

Adapted to pass along the top surface of the rails B and C is a small truck or carrier P, which carries the trolley-leg K and upon the lower end of which are arms $K^2$ and $K^3$, which carry on their outer ends contact-shoes J and $J^2$, and the trolley-leg K and the arms $K^2$ and $K^3$ are formed of insulating material and are preferably hollow.

Passing into and through the trolley-leg K are two wires S and $S^2$, the wire S passing to and being secured to the contact-shoe J and the wire $S^2$ passing to and being secured to the contact-shoe $J^2$, and it will be understood that the wires S and S² are connected with a motor on the car in the usual manner.

In the practice of my invention I prefer to employ on the inner sides of the T-rail B a plurality of clamp-bolts N, formed of a longitudinal member N² and a bolt N³, arranged at right angles on the end thereof, said bolt N³ being provided with nuts N⁴, and these bolts are adapted to pass through the ordinary fish-plate N⁵ on the outer side of the T-rail B, and thus serve to lock the sections of the rail B together without taking up the room necessary for the ordinary fish-plate.

The lead E serves as the feed for the motor of the car, while the lead H serves as the return for said motor, and because of the insulated trolley-leg and arms thereof the contact-shoes J and J² are insulated from each other and the current passes through the wire S to the motor and back over the wire S² to the return-lead H and the circuit is complete.

My invention is simple in construction and operation, and positive contact is secured with both the feed and return conductors, and the feed-conductor F is protected from moisture or from articles dropping thereon through the slot A, and the carrier P being merely a trailer is not affected by the jolting movement of the car or in its passing around curves, and it will be evident that various changes in the construction shown and described may be made without departing from the spirit of my invention or sacrificing its advantages, and, with this reservation,

What I claim as new, and desire to secure by Letters Patent, is—

1. A conduit for electric railways, comprising a T-rail, a guard-rail arranged parallel thereto and between which and the T-rail is a slot, said guard-rail being provided with an inner longitudinal recess, a feed-conductor in said recess, a return-conductor on said T-rail and parallel leg members through said slot and provided with oppositely-directed arms having shoes which bear against said conductors, and wires connected with said shoes and passing through said arms and said leg, substantially as shown and described.

2. In a conduit for electric tramways, a guard-rail, a T-rail, said guard-rail being provided with a recess in the upper inner portion thereof, a feed-conductor in said recess, and insulating-pegs serving to hold said conductor in position, substantially as shown and described.

3. In a conduit for electric tramways, a T-rail provided with the usual bolts for holding the same in position and the ends of said bolts being wedge-shaped, a U-shaped electric conductor arranged over and on said bolts and insulating material between said conductor and said bolts, substantially as shown and described.

4. In a conduit for electric tramways, a T-rail, a guard-rail separated therefrom and forming a slot between said guard-rail and said T-rail, a carrier adapted to pass along the inner edges of said guard-rail and T-rail, a trolley-leg supported by said carrier and flexible means for connecting said carrier with a motor on said tramway, substantially as shown and described.

5. In a conduit for electric tramways, a U-shaped feed-conductor, a U-shaped return-conductor, an insulator trolley-leg, insulating-arms on said leg, a contact-shoe on each of said arms and adapted to bear against said conductors, and a wire connected with each of said contact-shoes and a motor or car on said tramway, substantially as shown and described.

6. In a conduit for electric tramways, a guard-rail, a T-rail parallel thereto and arranged at a distance therefrom, a feed-conductor in said guard-rail, a return-conductor on said T-rail, and a trolley-leg adapted to make electrical connection with each of said conductors, substantially as shown and described.

7. In a conduit for electric tramways, a T-rail, bolts holding said T-rail in position, the tops of said bolts being wedge-shaped and an electrical conductor mounted upon and held by said bolts, and insulated therefrom, substantially as shown and described.

In testimony that I claim the foregoing as my invention I have signed my name, in presence of the subscribing witnesses, this 13th day of May, 1904.

WILLIAM COPE.

Witnesses:
 LORIN ANDREWS LATHROP,
 GEO. E. COLES.